Jan. 17, 1967  J. S. ADDISON ETAL  3,298,326
LOAD RETAINING FLEXIBLE SLING
Filed Sept. 27, 1965
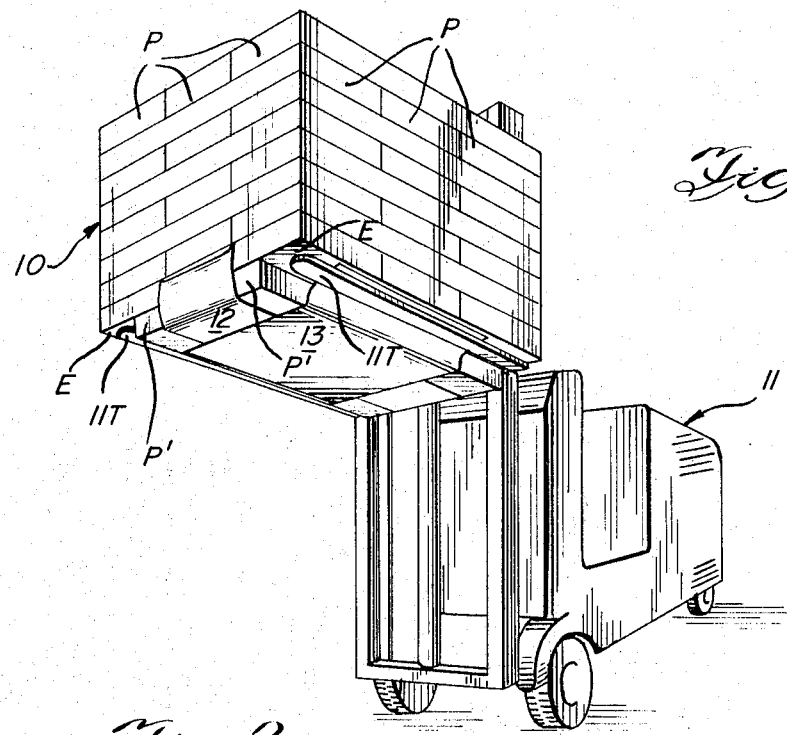
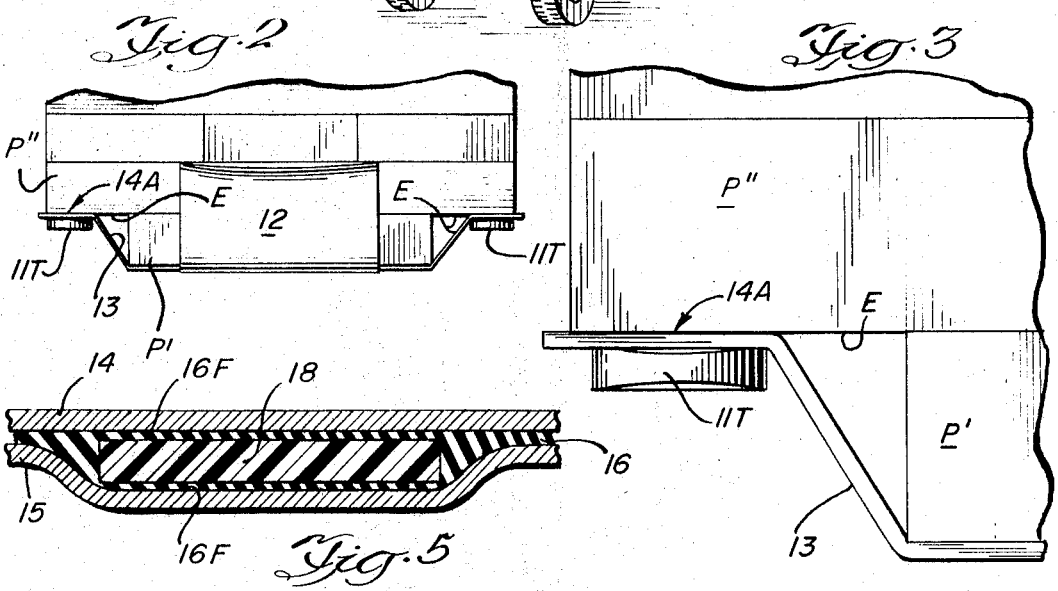
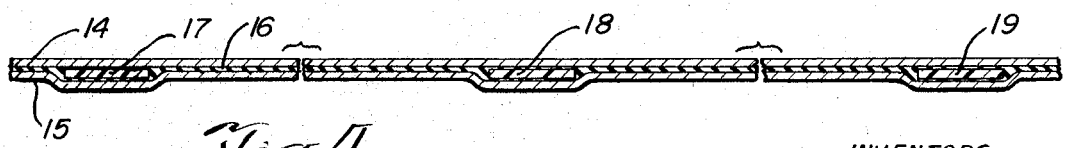
INVENTORS
Robert P. Ryan
John S. Addison
BY
ATTORNEYS

United States Patent Office 3,298,326
Patented Jan. 17, 1967

3,298,326
LOAD RETAINING FLEXIBLE SLING
John S. Addison and Robert P. Ryan, Racine, Wis., assignors to Signode Corporation, a corporation of Delaware
Filed Sept. 27, 1965, Ser. No. 490,425
14 Claims. (Cl. 108—51)

This invention relates to load retaining devices and more particularly is concerned with a load retaining flexible sling serviceable as a flexible pallet in connection with handling unitized loads with fork trucks.

It is desirable with many products which are packaged in small bundles to establish load stacking patterns suited to palletizing to enable large quantities of the product to be handle as a unitized load on a fork truck. The same pallet remains with its load to facilitate handling in the manufacturer's warehouse, to facilitate long distance shipment and to facilitate delivery to the end point of use.

Conventional wood pallets are frequently used for this purpose but in many instances involving non-rigid packages or bundles, the weight of the load and the irregular configuration of the wood pallet result in indenting of the lowermost portions of the load. One example where this problem is acute is found in the case of the asphalt shingle industry where this type of damage to the product is termed "staining" or "imprinting."

The present invention provides a retaining sling construction serviceable in various load retaining applications and particularly suited to serve as a flexible pallet for establishing stacked arrays in unit loads for handling and shipment.

The retaining sling is constituted by a laminar array of outer flexible sheets bonded to a flexible layer of solidified filler material, with a number of flexible straps extending through the layer. A principal advantage of the retaining sling construction is that it presents a smooth load contacting surface that is flexibly conformable to the contour of the load to adapt to various load configurations and yet prevent indenting of the load.

Moreover, this retaining sling arrangement lends itself to lightweight, low cost, easily stored weather-resistant constructions that may be disposed of economically after use, thus eliminating the annoying shipping and accounting problems associated with returnable pallets.

In accordance with the invention, the flexible pallet embodiment herein described and illustrated employs outer sheets of high wet strength kraft paper, a filler layer of asphalt material solidified in situ therebetween and having a set of three flexible steel straps extending in side-by-side spaced relation therein.

Other and further features of the invention will be apparent from the following description and claims, and are illustrated in the accompanying drawings which show structure embodying features of the present invention and the principles thereof.

In the accompanying drawings forming a part of the specification, and in which like numerals are employed to designate like parts throughout the same:

FIG. 1 is a perspective view illustrating a fork truck supporting a unitized load at an elevated position to reveal the retaining sling arrangement which is incorporated in the bottom of the load;

FIG. 2 is a fragmentary front elevational view of the lower region of the unitized load in its supported relation on the lift tines of the fork truck;

FIG. 3 is an enlarged fragmentary front elevational view illustrating one end region of FIG. 2;

FIG. 4 is a fragmentary transverse sectional view through the retaining sling with mid-width portions thereof omitted and is taken as indicated by the line 4—4 of FIG. 3; and FIG. 5 is a greatly enlarged fragmentary transverse sectional view through a central region of the retaining sling and showing a flexible strap embedded within a layer of filler material that is bonded between the outer sheets of the sling.

Referring now to the drawings and particularly to FIG. 1, a unitized load is designated generally at 10 and is shown supported at an elevated position on the lift tines 11T of a fork truck which is designated generally at 11. The particular unitized load comprises multiple tiers of packages P having a first retaining sling 12 embracing the two lower tiers and running transversely of the gap between the lift tines and having a second retaining sling 13 underlying the first tier and underlying overhanging end portions E of the second tier.

Each of the packages P may comprise a stack of asphalt shingles enveloped in suitable wrapping paper. It will be noted that in the particular unitized load shown in FIG. 1, the stacking array is such that two elongated packages P' are positioned side-by-side to extend transversely of the gap between the lift tines 11T. In the second tier, three elongated packages P" are positioned side-by-side to extend lengthwise across the tine gap and present overhanging end portions E for supported engagement upon the tines 11T. In the remainder of the load, each of the higher tiers consists of three packages P with the elongated dimension of the packages alternating in successive tiers.

In one exemplary practice of the invention, the retaining sling 12 is 20" wide and 58" long and its main length underlies the first tier and its ends extend around the opposite sides of the first and second tiers and are glued thereto and to the top of the second tier. The retaining sling 13 is 20" wide and 43" long and it underlies the central portion of the sling 12 and the edges of the packages P' of the first tier and then extends upwardly and endwise to underlie and contact the overhanging end portions E of the packages P" of the second tier. The lower retaining sling 13 is glued to the overhanging end portions E of the packages in the second tier so that it is physically integrated as a permanent part of the unitized load.

The lower sling 13 serves as a flexible pallet in that it is to be engaged by the lift tines 11T and performs the primary load supporting function. Thus, the flexible pallet 13 is subjected to substantially more severe service conditions than is the retaining sling 12. However it is preferred that both elements 12 and 13 be constructed in accordance with the invention disclosed herein.

The detailed disclosure here is directed to the retaining sling 13 which serves as a flexible pallet. As best shown in FIGS. 4 and 5, the flexible pallet construction comprises a laminar array having a pair of outer flexible sheets 14 and 15 adhered upon a flexible layer 16 of filler material having a plurality of high tensile strength flexible straps 17, 18 and 19 extending in side by side spaced relation. For the particular 20" width construction under consideration, a set of three flexible straps are shown in FIG. 4, the outermost straps 17 and 19 being adjacent the edges of the sheets 14 and 15 and the middle strap 18 being centered.

The layer of filler material is of a bonding type which is solidified in situ between the upper and lower sheets 14 and 15 to be in bonded contact to each strap and to each sheet. In particular, the laminar array is formed so that the layer 16 of filler material extends throughout the space existing between the upper and lower sheets 14 and 15, at least in the region of this space which runs from the lateral outermost extremities of the edge straps 17 and 19. Thus, the layer of filler material is a molded counterpart of the entirety of the strapless region between the outermost lateral extremities of the edge straps 17 and 19. While the layer is somewhat thinner than the straps, it normally includes a film portion 16F overlying and underlying each strap to adhere each strap to each sheet as is best seen in the enlarged view of FIG. 5.

In one actual constructional embodiment for use with asphalt shingle loads, the outer sheets 14 and 15 are of 50 pound wet strength kraft paper, about 0.005 inch thickness, which are laminated together by pouring asphalt therebetween to solidify in situ and provide the layer 16, about 0.005 inch thickness or less. The straps 17, 18 and 19 are of ¾ inch width and 0.015 inch thickness steel strapping and are inserted at the time the sheets are being laminated to the asphalt. It should be noted that the upper sheet 14 presents a substantially smooth load contacting surface to avoid staining or indenting the load.

The laminar array is formed in production in continuous length and stored as a reel mounted roll at the plant of the user. It may then be unrolled and cut to length and printed with the user's identification and at this time may be coated with adhesive at the surface locations 14A of the upper sheet which ultimately are to contact the overhanging end portions E.

Where desired, when the laminar array is produced and stored in roll form, it may be preprinted with external coatings of pressure sensitive adhesive at predetermined regularly spaced intervals. Alternatively, adhesive can be applied at the plant of the user at the time the roll is paid out from the reel. The invention also contemplates production, storage and handling arrangements wherein the array is initially fabricated appropriately cut to length and coated with adhesive either during manufacture or at the plant of the user.

For convenience in manufacture, each of the sheets 14 and 15 and each of the straps 17, 18 and 19 are reel mounted to be paid out in the same direction and in a continuous relationship. To provide that the upper sheet 14 be substantially planar and present a smooth load contacting surface, the upper sheet 14 is located at the bottom during manufacture and the asphalt is poured onto the sheet 14, with the sheet 15 being applied on top and assuming an irregular contour determined by the thickness of the steel straps.

The steel straps 17, 18 and 19 exhibit a natural curvature and are arranged normally to bias the laminar array in a sense to make the upper sheet 14 concave. Correspondingly, the reel mounted laminar array is stored with the sheet 14 innermost to maintain this curvature. Ultimately the tendency to curve is used to advantage as it enables the sling to tend to conform to the stepped configuration presented by the lower tiers.

In normal use, the laminar array is payed out from its storage reel at the user's plant, is cut to length, and appropriately printed with identification and adhesive to then constitute a flexible pallet ready for use.

The pallet 13 is set out on the floor with the adhesive coated sheet 14 uppermost. The array of packages are stacked on the pallet and the adhesive areas 14A engaged against the overhanging end portions E to provide a unitized load ready for repeated pickup and deposit by the lift tines 11T of a fork truck.

The pallet 13 with its load can withstand severe mechanical abuse from rough handling and can resist moisture attack encountered in normal operations.

Other types and grades of paper and various synthetic materials may be employed for the sheets 14 and 15. The desirable characteristics of the sheet material are high tear strength, both wet and dry, ease of disposal, and low cost. Other types of strapping and synthetic materials or other elongated tensilely strong reinforcements may be employed for the straps 17, 18 and 19. Finally, other bonding type filler materials may be employed for the layer 16. Strong adherence, ease of handling, resistance to moisture and high flexibility and conformability are desirable characteristics for the filler material.

Thus, while preferred constructional features of the invention are embodied in the structure illustrated herein, it is to be understood that changes and variations may be made by those skilled in the art without departing from the spirit and scope of the appended claims.

What is claimed is:

1. A load retaining flexible sling comprising a laminar array having a pair of outer flexible sheets adhered upon a flexible layer of filler material having a plurality of high tensile strength flexible straps extending lengthwise in side by side spaced relation therein, one of said sheets having a smooth load contacting surface to avoid imprinting of the load and having an exterior surface coating of adhesive, said sheets, said layer and said straps being flexible about lines transverse of the lengthwise direction of said straps.

2. A load retaining flexible sling comprising a pair of outer flexible sheets bounding a central space, a plurality of high tensile strength flexible straps extending lengthwise in side by side spaced relation through said space, and moldable filler material completely occupying and constituting a flexible molded counterpart of the entirety of the strapless region of said space between outermost lateral extremities of said straps, said filler material having bonded contact to each strap and to each sheet, one of said sheets having a smooth load contacting surface to avoid imprinting of the load and having an exterior surface coating of adhesive, said sheets, said layer and said straps being flexible about lines transverse of the lengthwise direction of said straps.

3. A flexible retaining sling comprising a laminar array of upper and lower flexible sheets sandwiched in in situ adhered relation upon a flexible layer of bonding type filler material having a plurality of flexible straps extending lengthwise in side by side spaced relation therein, said straps being of greater thickness than said layer and said upper sheet being substantially smooth and free of abrupt contour changes at the straps, said sheets, said layer and said straps being flexible about lines transverse of the lengthwise direction of said straps.

4. A flexible retaining sling comprising a laminar array of upper and lower flexible sheets of high wet strength kraft paper having a flexible layer of solidified asphalt in in situ surface bonded engagement therebetween, said layer having a plurality of flexible straps extending lengthwise in side by side spaced embedded relation therein and each strap having a natural curvature normally tending to bias the sling towards a configuration wherein said upper sheet is concave, said sheets, said layer and said straps being flexible about lines transverse of the lengthwise direction of said straps.

5. In a unitized shipping load adapted for pickup, transport and deposit by truck mounted lift tines and comprising multiple tiers of packages in an array wherein the second tier has portions overhanging the first tier at opposite sides thereof and a retaining sling underlying the first tier and having opposite lengthwise ends underlying said overhanging portions to be engaged thereagainst by the lift tines, said sling comprising upper and lower flexible sheets in surface securement upon a flexible layer of filler material having a plurality of high tensile strength flexible straps extending lengthwise in side by side spaced relation therein, said sheets, said layer and said straps being flexible about lines transverse of the lengthwise direction of said straps.

6. In a unitized shipping load adapted for pickup, transport and deposit by truck mounted lift tines and comprising multiple tiers of packages in an array wherein the second tier has portions overhanging the first tier at opposite sides thereof and a retaining sling underlying the first tier and having opposite lengthwise ends underlying said overhanging portions to be engaged thereagainst by the lift tines, said sling comprising upper and lower sheets of high wet strength kraft paper bordering a central space, a plurality of flexible steel straps extending in side by side spaced relation and in an endwise direction through said space, moldable asphalt filler material occupying and constituting a molded counterpart of the entirety of the strapless region of said space between outermost lateral extremities of said straps, said filler material having in situ bonded contact to each strap and to each sheet, each strap having a natural curvature normally tending to bias the sling towards a configuration wherein said upper sheet is concave.

7. An arrangement in accordance with claim 6 and wherein said sling has external surface coatings of pressure sensitive adhesive on regions of said upper sheet that contact said overhanging portions.

8. A load supporting flexible pallet comprising a laminar array of upper and lower flexible sheets in surface securement upon a flexible layer of filler material having a plurality of high tensile strength flexible straps extending lengthwise in side by side spaced relation therein, said sheets, said layer and said straps being flexible about lines transverse of the lengthwise direction of said straps.

9. A load supporting flexible pallet comprising upper and lower sheets of high wet strength kraft paper sandwiched upon a flexible layer of asphalt solidified in situ in surface bonded engagement with each of said sheets, said layer having a plurality of flexible steel straps extending lengthwise in side by side spaced relation therein and each having a natural curvature normally tending to bias the pallet towards a configuration wherein said upper sheet is concave, said sheets, said layer and said straps being flexible about lines transverse of the lengthwise direction of said straps.

10. A load supporting flexible pallet comprising upper and lower flexible sheets bordering a central space, a plurality of flexible straps extending lengthwise in side by side spaced relation through said space, and moldable filler material completely occupying and constituting a molded counterpart of the entirety of the strapless region of said space between outermost lateral extremities of said straps, said filler material having bonded contact to each strap and to each sheet, said sheets, said layer and said straps being flexible about lines transverse of the lengthwise direction of said straps.

11. In a unitized shipping load adapted for pickup, transport and deposit by truck mounted lift tines and comprising multiple tiers of side by side packages in an array wherein a bottom central package and flanking portions of other packages are exposed for underneath contact and a retaining sling underlying said central package and having opposite lengthwise ends underlying said flanking portions to be engaged thereagainst by the lift tines, said sling comprising upper and lower sheets of high wet strength kraft paper bordering a central space, a plurality of flexible steel straps extending lengthwise in side by side spaced relation and in an endwise direction through said space, moldable asphalt filler material occupying and constituting a molded counterpart of the entirety of the strapless region of said space between outermost lateral extremities of said straps, said filler material having in situ bonded contact to each strap and to each sheet, said sheets, said filler material and said straps being flexible about lines transverse of the lengthwise direction of said straps.

12. An arrangement in accordance with claim 11 and wherein said sling has external surface coatings of pressure sensitive adhesive on regions of said upper sheet that contact said overhanging portions.

13. In a unitized shipping load adapted for pickup, transport and deposit by truck mounted lift tines and comprising multiple tiers of packages in an array wherein the second tier has portions overhanging the first tier at opposite sides thereof and a retaining sling underlying the first tier and having opposite lengthwise ends underlying said overhanging portions to be engaged thereagainst by the lift tines, said sling comprising upper and lower sheets of high wet strength kraft paper bordering a central space, a plurality of flexible steel straps extending in side by side spaced relation and in an endwise direction through said space, moldable asphalt filler material occupying and constituting a molded counterpart of the entirety of the strapless region of said space between outermost lateral extremities of said straps, said filler material having in situ bonded contact to each strap and to each sheet.

14. An arrangement in accordance with claim 13 and wherein said sling has external surface coatings of pressure sensitive adhesive on regions of said upper sheet that contact said overhanging portions.

References Cited by the Examiner

UNITED STATES PATENTS

| | | | |
|---|---|---|---|
| 2,455,197 | 11/1948 | Sullivan | 108—52 |
| 2,643,080 | 6/1953 | Vogel | 108—51 |
| 2,918,242 | 12/1959 | Olivette et al. | 108—51 |
| 3,112,715 | 12/1963 | Callahan et al. | 108—52 |
| 3,135,228 | 6/1964 | Fleming et al. | 108—51 |
| 3,187,688 | 6/1965 | Kreilick | 108—55 |

FOREIGN PATENTS 800,453  8/1958  Great Britain.

FRANK B. SHERRY, *Primary Examiner.*

G. O. FINCH, *Assistant Examiner.*